(12) United States Patent
Frigo et al.

(10) Patent No.: US 6,466,342 B1
(45) Date of Patent: Oct. 15, 2002

(54) OPTICAL TRANSMISSION SYSTEM AND METHOD USING AN OPTICAL CARRIER DROP/ADD TRANSCEIVER

(75) Inventors: Nicholas J. Frigo; Patrick P. Iannone, both of Red Bank; Kenneth C. Reichmann, Hamilton Square, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/472,338

(22) Filed: Dec. 27, 1999

Related U.S. Application Data

(60) Provisional application No. 60/120,726, filed on Feb. 18, 1999.

(51) Int. Cl.[7] .......................... H04J 14/02; H04B 10/20
(52) U.S. Cl. ........................ 359/127; 359/152; 359/119
(58) Field of Search .................. 359/118–119, 127, 359/152, 181

(56) References Cited

U.S. PATENT DOCUMENTS 5,111,322 A * 5/1992 Bergano et al. ............. 359/122
5,608,565 A * 3/1997 Suzuki et al. ............... 359/154

* cited by examiner

Primary Examiner—Kinfe-Michael Negash
(74) Attorney, Agent, or Firm—Oliff & Berridge, PLC

(57) ABSTRACT

An optical carrier drop/add transmission system and method using a same optical carrier to both drop traffic from an optical network and to add traffic to the optical network. An optical carrier signal is received by a transceiver and is subsequently split into a first and second optical signal. The first optical signal can be converted into an electrical signal for processing by the subscriber (i.e., data out). The electrical signal corresponding to the first optical signal is additionally inverted by the transceiver. The inverted electrical signal is subsequently modulated with the second optical signal in order to create a nominally flat signal ("optical chalkboard"). The subscriber's data is then modulated onto the flat signal and sent across the optical network. As a consequence, the network subscriber controls the format and protocols of the data traffic on the optical network, while the optical network service provider controls the optical carrier wavelengths, which are of primary concern to maintain organization and efficiency on the optical network.

15 Claims, 9 Drawing Sheets

OPTICAL TRANSMISSION SYSTEM AND METHOD USING AN OPTICAL CARRIER DROP/ADD TRANSCEIVER

This non-provisional application claims the benefit of U.S. Provisional Application No. 60/120,726 entitled "Optical Ring Admission Scheme Using a Single Optical Carrier Drop/Add Transceiver" which was filed on Feb. 18, 1999 and is hereby incorporated by reference in its entirety. The Applicants of the provisional application are Nicholas Frigo, Patrick Iannone, and Kenneth Reichmann.

BACKGROUND OF THE INVENTION

1. Field of Invention

This invention relates to an optical admission scheme using an optical carrier drop/add transceiver.

2. Description of Related Art

Communication information can be routed between customers using various different kinds of communication networks, including optical fiber communication networks. One type of optical network uses a ring configuration to send information to and receive information from subscribers. In a ring network, nodes which route, terminate, or otherwise process signals are connected by optical communication links, such that the links form a single loop. Optical ring networks may employ wavelength division multiplexing (WDM), in which a plurality of communication channels, in the form of discrete wavelength, are combined into a single optical transmission medium, such as an optical fiber.

Traffic on such WDM optical rings may be hubbed, in which case all wavelength channels originate and/or terminate at a central hub node, while one or more wavelength channels are supplied to each subscriber by corresponding add/drop modules that are located at remote nodes of the ring. Each of the add/drop modules also integrates communication information provided by a corresponding subscriber into the optical communication system so that the subscriber's communication information is returned to the hub node. For traffic which is not hubbed, a wavelength channel can originate at a first subscriber, be integrated into a communication link by a first add/drop module, be transported to a second add/drop module capable of selecting the corresponding wavelength, and be terminated by a second subscriber. More complex mesh networks can be constructed by combining rings which intersect at one or more nodes.

SUMMARY OF THE INVENTION

As the traffic level of large users approaches the line rate for a single wavelength of light on a network operator's ring, there is an incentive to permit the user to make a direct optical connection to the network ring. To provide the communication channels to a subscriber, each of the add/drop modules filter out a particular wavelength channel by either selecting or filtering, a specific wavelength channel. Thus, the add/drop modules are capable of selecting a set of particular wavelength channels from the plurality of channels present on the optical network.

Permitting a subscriber to make a direct optical connection to the network ring can increase efficient communication between subscribers. For example, two subscribers sharing a direct optical connection on a network ring can communicate in a native or custom format, rather than the conventional manner of requiring each subscriber to convert to and from an optical network service provider's mandatory format. Conversion to and from a mandatory standard format can require the use of costly conversion equipment and can incur inefficiencies in the communication between nodes.

However, the advantages of permitting a subscriber to make a direct optical connection to an optical network ring can be offset by the network's vulnerability to subscriber errors which are beyond the control of the optical network service provider. For example, a direct optical connection requires the subscriber to receive and transmit data on a very specific channel (wavelength) of the optical network ring. Variations caused by changing conditions, such as temperature, make constant operation at a specific channel difficult to monitor and control. Furthermore, using a direct connection with the optical network ring, any errors introduced by the subscriber, such as incorrect operating wavelengths, are beyond the control of the optical network service provider, and may corrupt not only the subscriber's communications, but also communications in neighboring wavelength channels. These problems are compounded by the fact that the wavelength control must be exercised at each wavelength and at each node.

The invention provides an optical carrier drop/add transceiver in which optical carriers are generated by the network operator at controlled locations and are shared by several users. That is, the same optical carrier both drops traffic from the optical network ring and adds traffic to the optical network ring. An optical carrier signal is received by the transceiver and is subsequently optically split into a first and second optical signal. The first optical signal can be converted into an electrical signal for processing by the subscriber (i.e., data out). The electrical signal corresponding to the first optical signal is additionally inverted by the transceiver. The inverted electrical signal is subsequently used to modulate the second optical signal in order to suppress the data, and thereby create a nominally cw signal. Since new data can now be impressed on this nominally cw signal, it is convenient to think of it as an "optical chalkboard" that has been reconstituted from the original signal. The subscriber's data is then modulated onto this nominally cw signal, and sent into the optical network. As a consequence, the network subscriber controls the format and protocols of the data traffic on the optical network, while the optical network service provider controls the optical carrier wavelengths, which are of primary concern to maintain organization and efficiency on the optical network. Thus, in essence this provides an admission scheme for the network operator to insure that only the correct wavelengths are admitted to the network without the need to impose format restrictions.

In the admission scheme of the present invention, the optical network service provider originates the network's optical carriers, either at the hub or node, which carry the subscriber's data. Therefore, the optical network service provider is insured adequate network control because the optical network service provider, whose primary concern is network integrity, completely controls the channels (wavelengths) over which the subscribers transmit/receive data. Additionally, the network subscriber, whose primary concern is data transport, controls the data format and the protocols by which the data is transmitted since the network subscriber imposes their own modulating signals on the light which the network service provider has supplied.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

Figure 1:
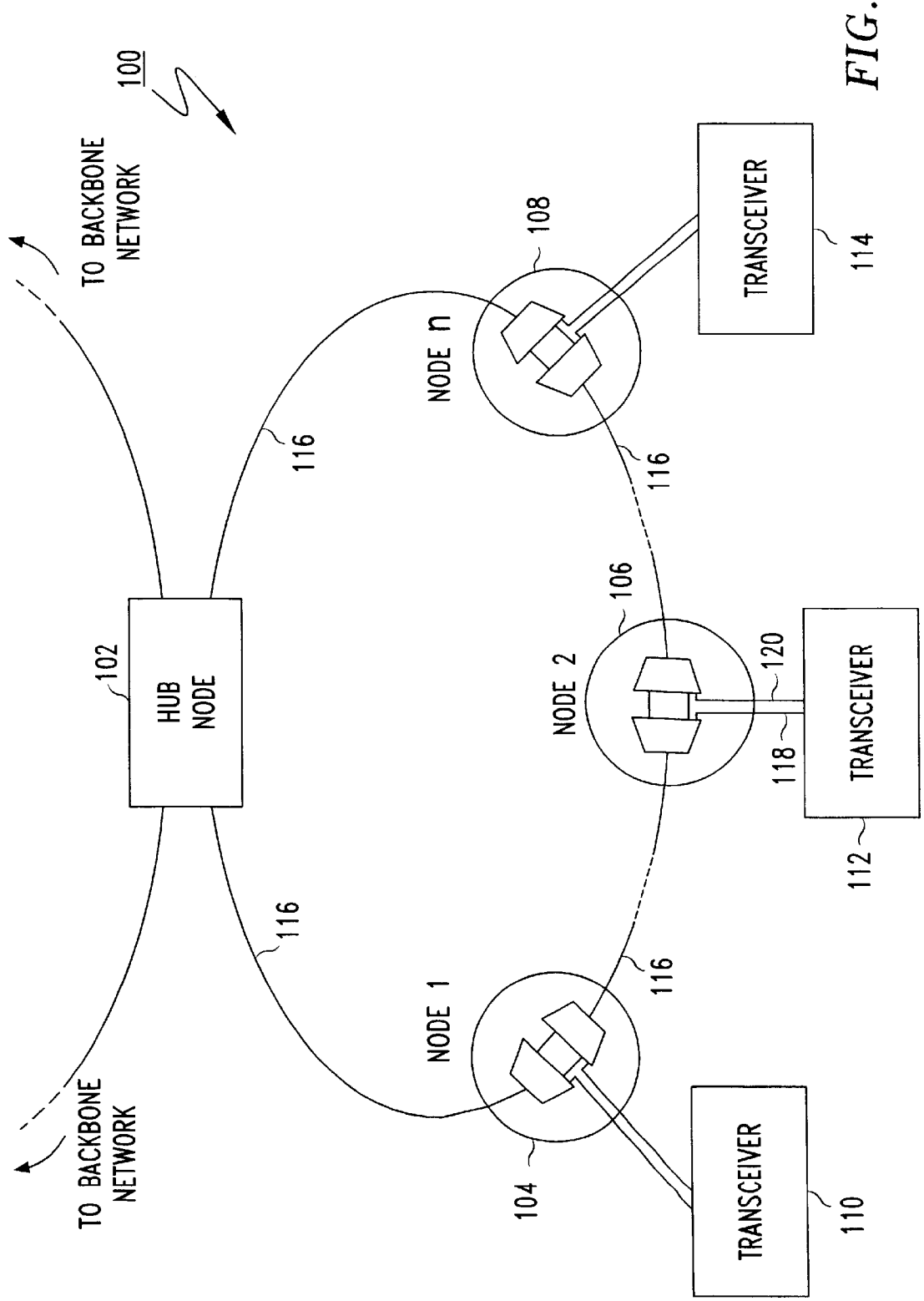
FIG. 1 is a schematic block diagram of a ring network according to the present invention.

Previous multiple access schemes which share upstream and downstream signals on a common "optical chalkboard" in time or RF space may require non-standard terminal equipment and formats. Such a technique is described in a paper written by N. J. Frigo, P. P. Iannone, M. M. Downs, and B. Desai, entitled "Mixed-Format Delivery and Full-Duplex Operation in a WDM PON with a Single Shared Source," Proc. OFC '95, San Diego, Ca. paper TuK5, pp. 55–57 (1995), incorporated herein by reference in its entirety.

For example, a recent optical ring architecture proposed sending a "write" optical carrier to drop traffic from the ring as well as a distinct "read" carrier to add traffic. A description of such an architecture can be found in a paper written by M. Sharma, H. Ibe, and T. Ozeki, entitled "WDM Ring Network Using a Centralized Lightwave Tech., vol. 15(6), pp. 917–929 (1997), incorporated herein by reference in its entirety.

Other optical network admission schemes allow a network subscriber to receive optical data on a specific carrier channel of the optical network and later transmit a new optical signal on the same optical carrier channel. The technique requires that the network subscriber have both an optical receiver and an optical transmitter. Furthermore, because the subscriber receives the optical signal on a particular channel, and then transmits an optical signal on the same channel, each optical transmitter for every subscriber must be exactly aligned to transmit at the given channel assigned to the network subscriber. If there is any variation from the assigned channel, the subscribers may introduce error into the network (i.e., incorrect operating wavelength will induce loss and crosstalk). While crosstalk on neighboring channels can be mitigated by sufficiently wavelength selective WDM multiplexers, practical WDM multiplexers generally have less stringent crosstalk specifications than demultiplexers (in order to reduce components costs).

Because the optical characteristics of the subscriber's optical receiver and optical transmitter are sensitive to changes in the environment, such as temperature, it has been very difficult for an end user to maintain transmissions within the respective designated channels without wandering or drifting outside of the channel. Furthermore, other optical transmitter properties, such as side-mode-suppression (SMS) ratio, will affect performance. Therefore, this conventional method requires the purchase and maintenance of transmitters that are typically expensive and complex, and require continual monitoring and management in order for a network subscriber to stay within an assigned channel.

In the present invention, the optical network service provider originates the network's optical carriers which carry the subscriber's data. Therefore, the optical network service provider is insured adequate network control because the optical network service provider completely controls the optical carrier over which the subscribers transmit/receive data. Furthermore, a single source can be used to carry data over more than one link since the transceiver described here "re-uses" the incoming optical carrier.

FIG. 1 is a schematic block diagram of an optical network 100. The network 100 can be provided with a set of wavelength channels (optical carriers), a hub node 102 that communicates with a backbone network (not shown), and a set of add/drop nodes 104, 106, and 108, each of which supports a plurality of user operated transceivers. The total number of wavelength channels can vary depending upon various criteria, such as the number of transceivers 110, 112, and 114 serviced by the network 100, the maximum bandwidth of one or more components of the network 100, a total number of channels required to provide desired communication services to all transceivers 110–114, etc. The wavelength channels are carried by communication links 116, that preferably are optical fiber links. Both the links 116 can include various components, such as amplifiers, routing devices, or other components to effect desired communication services.

The links 116 interconnect the hub node 102 with add/drop nodes 104–108 positioned throughout the network 100. Each of the add/drop nodes 104–108 selects a channel of the set of wavelength channels and provides the channel to a corresponding transceiver 110–114. While the network is shown as an optical ring network, it is to be understood that other network configurations are possible without departing from the spirit and scope of the present invention. For example, the present invention could also be used in a mesh topography.

The transceiver 110–114 receives data signals on an optical channel via a communication link 118 and reads the data present on the channel. After reading the data signal, the transceiver 110–114 suppresses the data by a further modulation of the optical signal to create a nominally cw optical signal on the same channel. The cw optical signal is referred to as an "optical chalkboard" since the nominal cw signal is an optical carrier signal at the specified channel wavelength having no data present thereon. The transceiver then writes new data onto the optical chalkboard and transmits the data signal across communication link 120 to the respective node 104–108 where the signal is further transmitted over the optical network 100.

The data signals, both entering and emerging from the transceivers 110–114 consist of optical carriers (wavelengths) which have been partially modulated by amplitude shift keyed (ASK) data. "Partially modulated" optical carriers are defined as optical carriers (wavelengths) which have been modulated with digital data such that a digital one has a high light level and a digital zero has a low light level which is substantially greater than zero. This is in contrast to most conventional digital optical transmission systems, for which a digital one has a high light level and a digital zero has nominally zero light level. The partial modulation format used here is required so that after suppressing the digital ones (i.e., modulating the ones down to the zeros level) a nominal cw optical signal (the optical chalkboard) remains with sufficient signal-to-noise ratio to serve at the optical carrier for the new data.

Figure 2A:
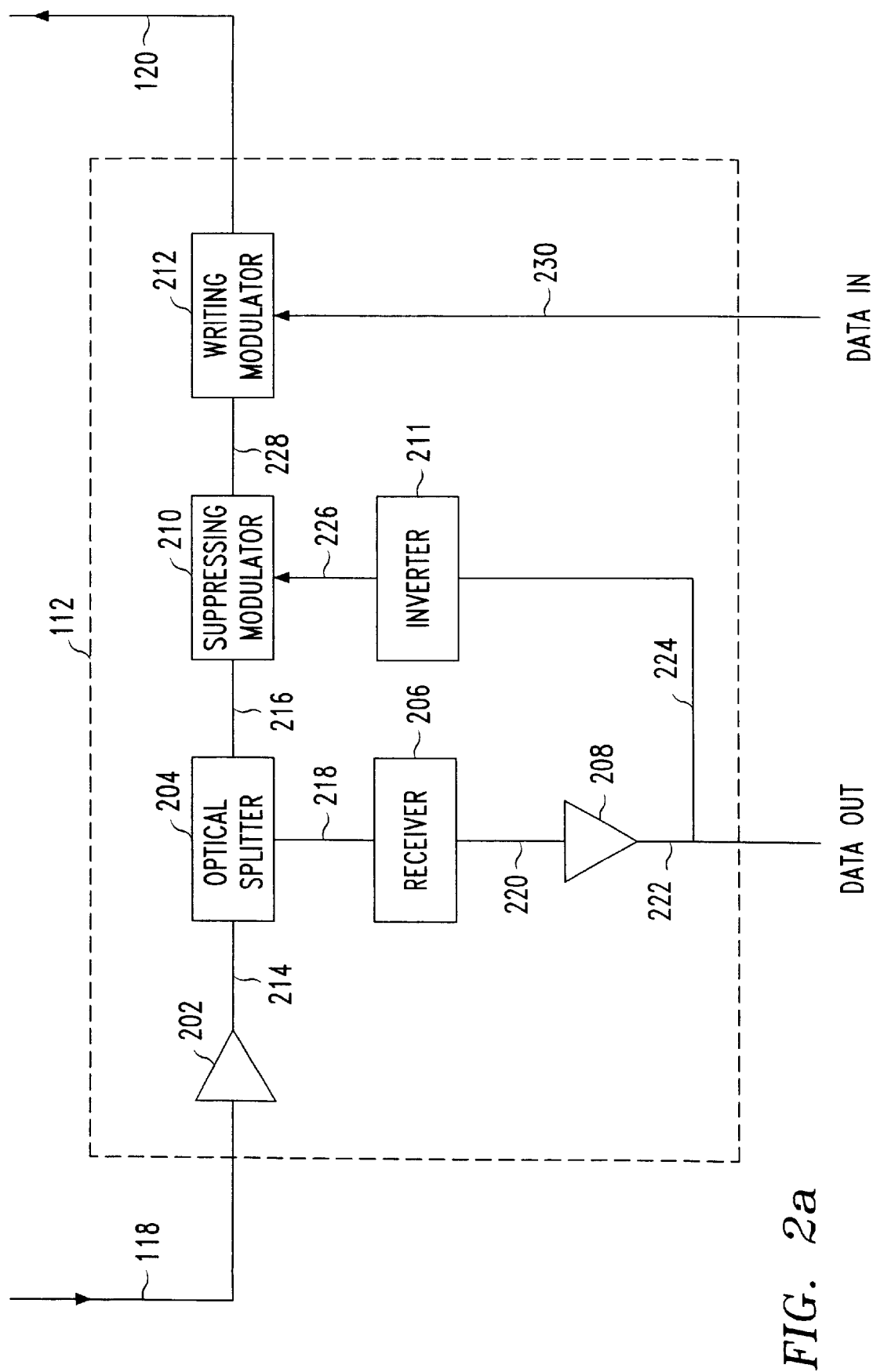
FIG. 2a is a block diagram of an exemplary optical carrier drop/add transceiver of FIG. 1.

FIG. 2a shows an exemplary block diagram of the transceiver 112. The transceiver 112 includes an optical amplifier 202, an optical splitter 204, a receiver 206, an electrical amplifier 208, an inverter 211, a suppressing electro-optical modulator 210, and a writing electro-optical modulator 212.

As the incoming optical data signal is received by transceiver 112 on the communication link 118, the optical signal passes through the optical amplifier 202. Since optical amplification is required at the node to compensate for transmission losses in the ring, the location of the amplifier 202 can be selected so that it can serve to both compensate the loss of the optical fiber in the ring and as a preamplifier for the receiver 206. The optical amplifier 202 amplifies the incoming optical signal and sends the optical signal to an optical splitter 204 along a communication link 214. The optical splitter 204 splits the optical signal into first and second optical data signals. The first optical data signal is sent by communication link 218 to receiver 206, while the second optical signal is sent onto communication link 216 to the suppressing modulator 210.

The first optical signal is received by receiver 206 and is converted from an optical data signal into a corresponding electrical data signal. The electrical data signal is sent along communication link 220 to amplifier 208. Once amplified, the amplified signal is then sent along a communication link 222 to a subscriber for further processing as a "data out" signal, such as communications processing.

Additionally, the output of the amplifier 208 is sent along a communication link 224 to the inverter 211. The inverter 211 need not be a distinct component, but may be incorporated into modulator 210. As an example, a lithium-niobate modulator, one particular embodiment of modulator 210, can operate as either an inverting or non-inverting modulator by appropriately tuning its DC bias voltage. The inverter 211 accepts the electric signal and inverts the signal to form an inverted signal corresponding to an inversion of the data on the first optical signal. The inverted signal is then sent over a communication link 226 to the suppressing modulator 210. The suppressing modulator is typically electro-optical, but could be a semiconductor optical amplifier/modulator. Care must be taken to ensure that the optical signal traverses link 216 in the same time that the optical/electrical signals traverse 218–226.

The suppressing modulator 210 accepts the second optical signal on the communication link 216 and the inverted electric signal on the communication link 226. The signal on link 226 drives modulator 210 such that each level of input results in a single level of output. Conceptually, for digital ones and zeros, ones are attenuated to the level of zeros and zeros are unattenuated, i.e., this becomes the optical chalkboard.

It is to be understood that while the processing of the first and second optical signals has been described in the electro-optical domain, the second optical signal may also be directly processed in the optical domain without departing form the spirit and scope of the present invention. For example, in an alternative embodiment the suppressing modulator 210 and associated drive circuit 211, 224 and 226 can be replaced by either an "optical limiter" or injection locked laser. In this embodiment, the optical data signal enters optical limiter or injection locked laser emerges.

An optical limiter or optical limiting amplifier is analogous to an electronic limiting amplifier, but operates in the optical domain. That is, both ASK "0"s and ASK "1"s would be amplified to approximately the same light level in an optical limiting amplifier, resulting in a constant light level at the output. This device is potentially advantageous in that it both suppresses the data imposed on the incoming optical carrier and provides amplification, while not requiring a potentially complex feed-forward circuit. In practice, an optical limiter may be a version of a semiconductor optical amplifier which is run in saturation (i.e., both the input "1"s and "0"s have sufficient optical power to be amplified to the maximum possible output power of the device.)

Similar functionality can be expected if an injection-locked laser is used rather than limiting amplifier. An injection-locked laser is a laser whose output optical signal frequency is locked to an optical signal injected into the laser. A laser includes a resonant cavity and a gain medium, which act as a narrow band filter whose output spectral width is typically determined by the laser geometry and the round-trip gain. Since an information-bearing optical signal has a spectral width proportional to the data rate, the output of an injection-locked laser can have suppressed data content relative to the input signal, provided that the modal width of the injection-locked laser is small compared to the data rate. In order for an injection-locked laser to completely suppress the data on an incoming optical signal, it may be necessary to shift the energy in the modulated spectrum away from DC by the use of a modulation format such as Alternate Mark Inversion (AMI) or Manchester Coding.

The resultant signal is one wherein the original incoming data signal, the second optical data signal on communication link 216, has been "erased" by removing the data portion of the data signal from the second optical signal. As described above, this technique creates a nominally cw optical signal, which is referred to as an "optical chalkboard". The optical chalkboard is then sent to the writing modulator 212 over communication link 228 for the writing of new data, "data in", that is to be added onto the optical network over communication link 120.

The writing modulator 212 accepts the optical chalkboard on communication link 228 and is driven by the new data from communication link 230, "data in", thus modulating the optical chalkboard. The modulated optical carrier emerges from the writing modulator 212 onto communication link 120. The communication link 120 returns the optical data signal to the corresponding node 106, where the data can be sent across the optical network 100 on the corresponding carrier channel.

The suppressing modulator 210 and the writing modulator 212 can be any device that modulates an optical signal onto a communication link with sufficient bandwidth and fidelity. Furthermore, the modulators 210, 212 can be wavelength independent, whereby light traveling through the modulator at any wavelengths arriving on 118 can be modulated. By using wavelength independent modulators 210, 212 the operation of the network is easier to manage since the network operator has the flexibility to change wavelengths on the link 118. An example of one possible modulator for use in the present invention is a Lithium Niobate (LiNbO$_3$) traveling waveguide modulator.

Figure 2B:
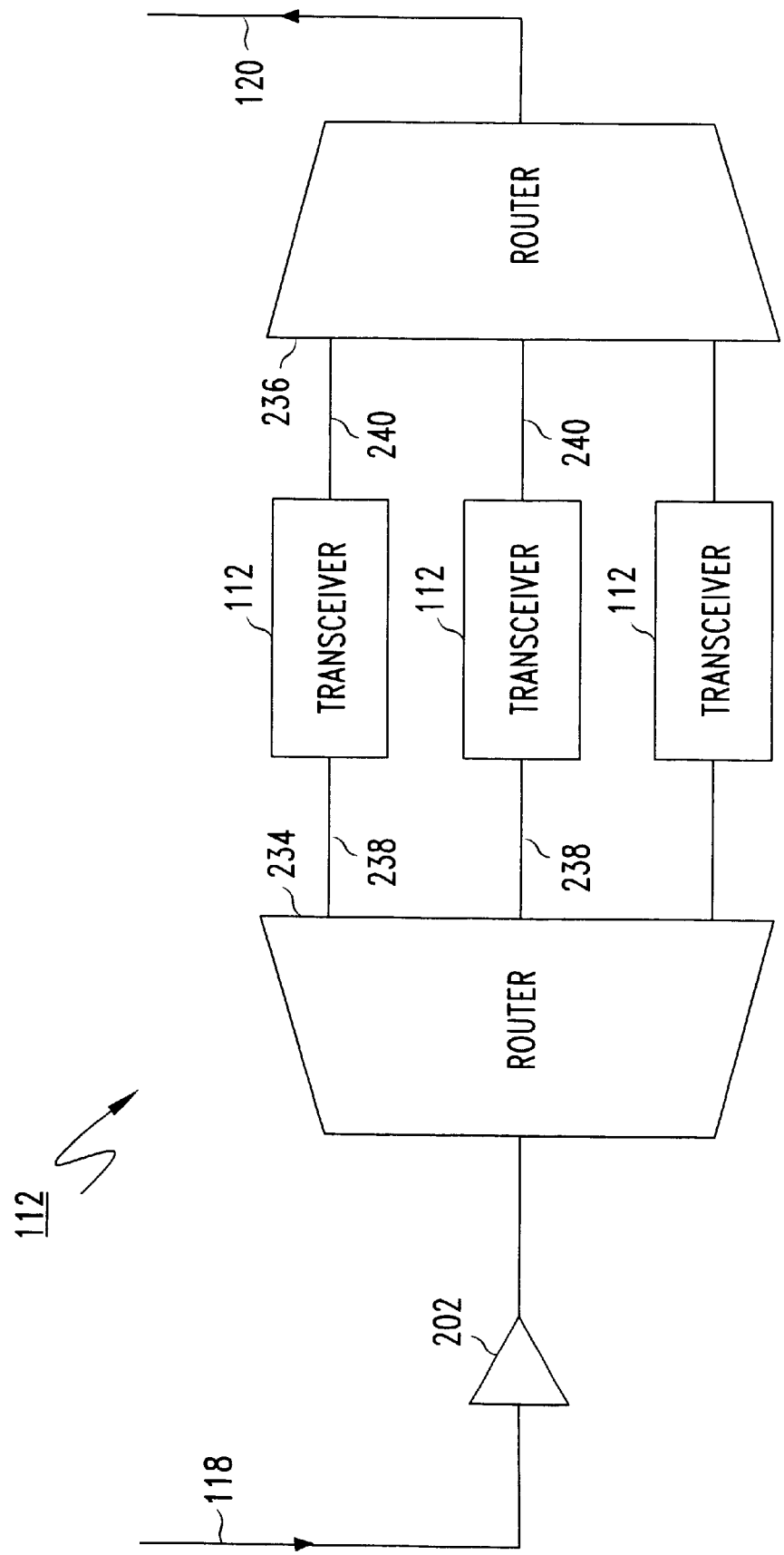
FIG. 2b is a block diagram of an alternative embodiment of the configuration of optical carrier drop/add transceivers of FIG. 1.

FIG. 2b shows a block diagram of an alternative embodiment having numerous optical carrier drop/add transceivers connected to communication links 118, 120 via WDM multiplexers, such as waveguide grating routers 234, 236. In this embodiment, numerous optical carrier drop/add transceivers 112 can receive a corresponding incoming signal from communication link 118. Furthermore, the transceivers 112 can transmit corresponding outgoing signals onto communication link 120.

In operation, the incoming optical data signal on communication link 118 is received by the optical amplifier 202. The optical amplifier 202 amplifies the incoming signal and transmits the optical signal to the waveguide grating router 234, which subsequently divides the incoming optical signal into a set of channels. Each of the channels are then directed via communication links 238 to a corresponding optical carrier drop/add transceiver 112. As described above with reference to FIG. 2a, the optical carrier drop/add transceiver 112 receives the incoming optical data signal on communication links 238, removes the incoming data, and then transmit outgoing optical data signal on communication link 240.

The separate channels of outgoing optical data signals on communication link 240 enter the WDM, waveguide grating router 236, which combines the data into an outgoing data signal. The outgoing data signal then emerges from the WDM, waveguide grating router 236, onto communication link 120. The communication link 120 returns the optical data signal to the corresponding node 106, where the data can be sent across the optical network 100 on the corresponding carrier channel.

In this manner, numerous optical carrier drop/add transceivers 112 can be used at each of the nodes. Furthermore, as shown in FIG. 2b, numerous optical carrier drop/add transceivers 112 can share a single optical amplifier 202 which can often be both complex and costly when multiple optical channels are amplified.

Figure 3A:
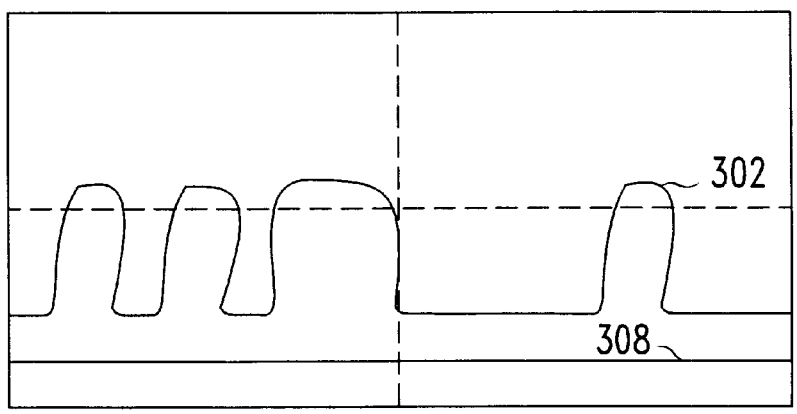
FIGS. 3a–c are exemplary graphs of optical signals which are received and transmitted by the drop/add transceiver of FIG. 1.
Figure 3B:
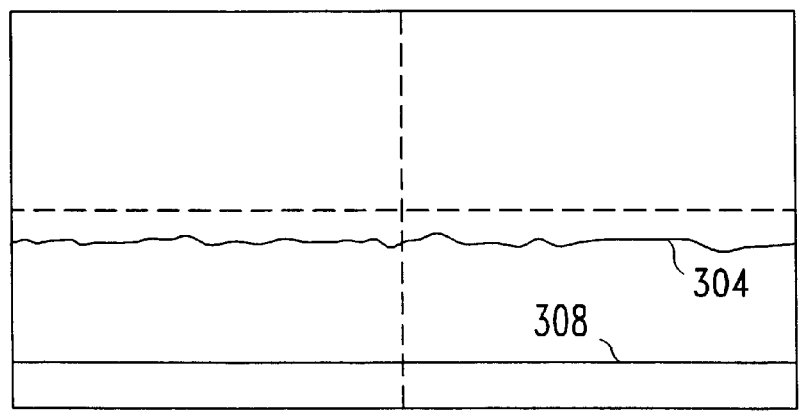
Figure 3C:
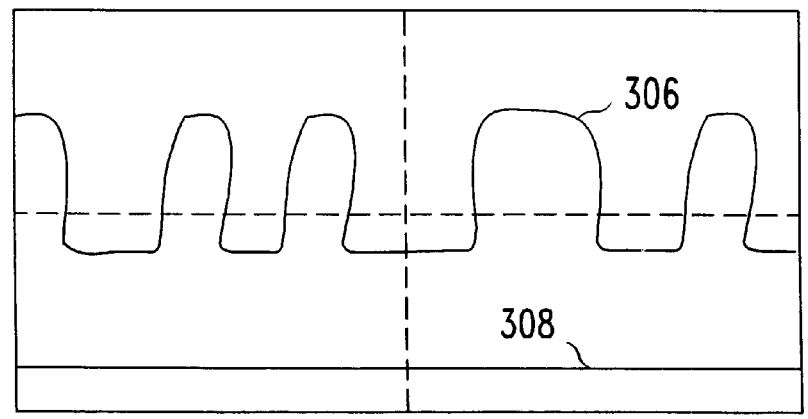

FIGS. 3a–3c are examples of plots of data signals at different stages as the data signal passes through the transceiver 112. FIGS. 3a–3c each include a dark level 308 which represents the absence of light. FIG. 3a shows a data signal 302 as the signal is received at the node 106 on a channel which is assigned to the transceiver 112. This is the "data out" received modulated signal from receiver 206 after the background level is electronically suppressed.

FIG. 3b shows the nominally flat optical chalkboard 304 emerging from suppressing modulator 210. The optical chalkboard 304 shown in FIG. 3b is not perfectly flat due to imperfections in the receiver 206, electronic amplifier(s) 208, inverter 211 and the suppressing modulator 210. In order to create a perfectly flat optical chalkboard, the circuit comprised by these components must be capable of modulating the incoming signal on communications link 216 with its exact inverse. This requires both high fidelity and broad bandwidth. In this case, "high fidelity" refers to the flatness of the frequency response of this circuit over its operating band coupled with negligible added noise. A perfectly flat frequency response over the entire information bandwidth of the incoming signal on communications link 214, with no added electronic noise, would result in a perfectly flat optical chalkboard. Non-ideal frequency responses and/or matching of the incoming data and the modulator create undesired AC signal errors on the chalkboard which are directly imposed on the subsequent data and impairs its transmission.

FIG. 3c is an example of an optical data signal 306 after the subscriber has written onto the optical chalkboard 304. Once the data, "data in", has been written onto the optical chalkboard 304, the optical data signal 306 is created and is sent over communication link 120. The data present in the optical data signal 306 is the optical equivalent of the data input on said communication link 230 by the subscriber.

Figure 4:
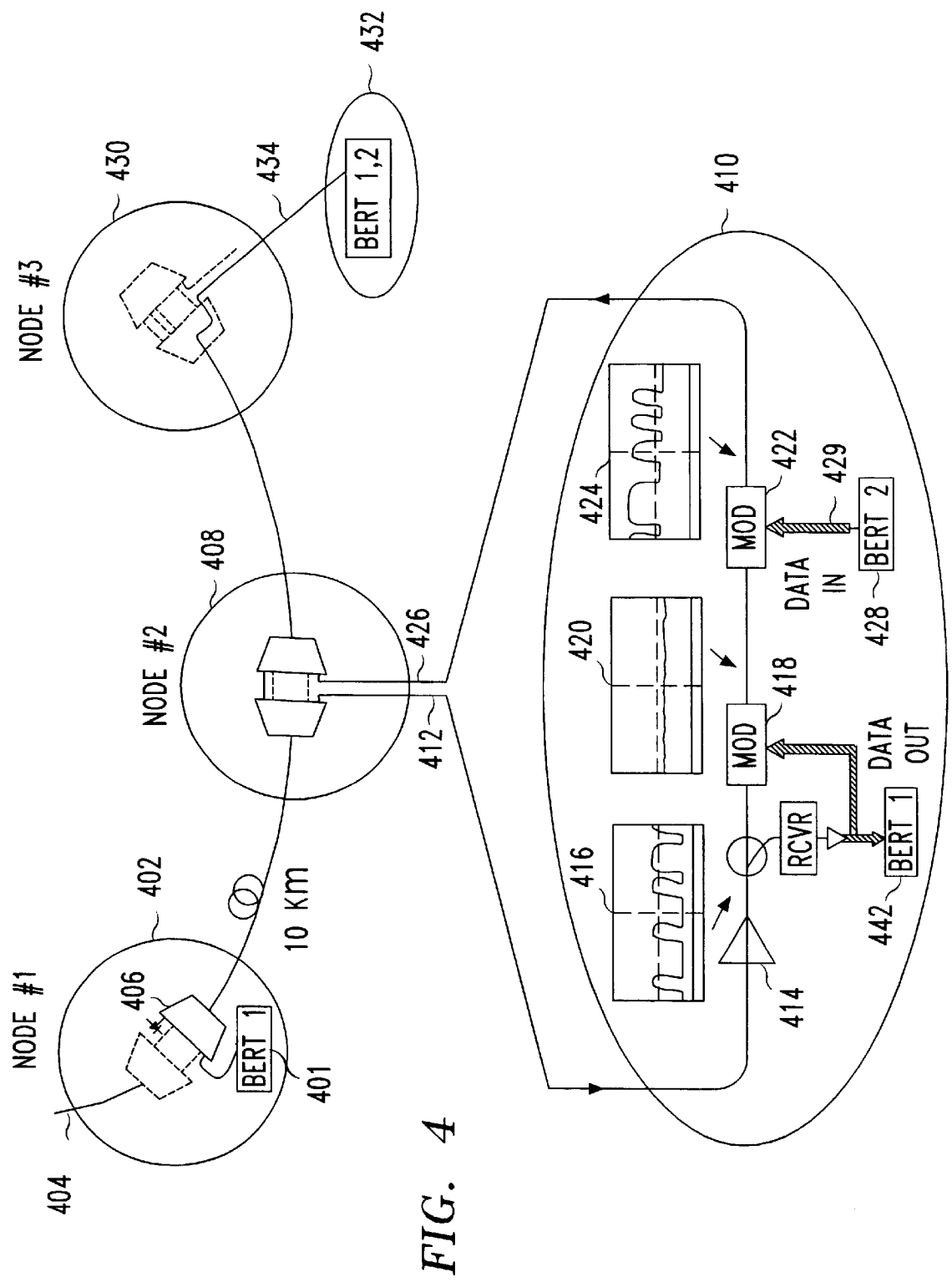
FIG. 4 is a block diagram of an experimental setup used to test the present invention.

FIG. 4 is a block diagram of an experimental setup which has been used to create plots in FIG. 3 and to test the present invention. In the setup, light from two semiconductor lasers, with carrier frequencies separated by 100 gHz, enters the network ring 404 from node 1 402 through a waveguide grating router 406 which has a 50 gHz channel spacing. A first of the wavelengths (channel 1) is unmodulated, to test for crosstalk, while a second of the wavelengths (channel 2) is partially modulated with a pseudo-random bit stream (PRBS) of $2^{23}-1$ length at 155 Mb/s, via a bit error rate test (BERT) set 401 which simulates traffic to be dropped to a subscriber at a node 2, 408, by the transceiver 410. As above, the partial modulation ensures that there will always be light that can be "reconstituted" for traffic to be added to the ring. That is, some of the time a "0" in inset 416 needs to be a "1" in inset 424 so that some light must always be present to ensure that there is enough light to make that "1" appear.

Light at the second wavelength is directed by node 2, 408, to the transceiver 410 over communication line 412. For convenience in our setup, the light was preamplified with an erbium-doped fiber preamplifier 414 and split into two optical chains however, since the preamplifier operated on only a single channel, it could also have been performed by a semiconductor optical amplifier. The lower optical chain detects the data, with a typical signal shown in the inset 416, to create the "Data Out" signal evaluated by BERT 1,442. (Electrical signals are represented by heavy striped arrows). The same detected electrical signal is applied to an electro-optic modulator 418 which enables suppression of the data in the upper chain by modulating the "1's" down to the same level as the "0's" to create a nominally flat "optical chalkboard" as shown in the inset 420. A second writing modulator 422 writes data from BERT 428 onto the newly formed optical carrier or optical chalkboard, inset 420, to create a new optical data signal, inset 424. The optical data signal, inset 424, is added to the network ring 404 on communication link 426.

The new optical data signal (originating from the BERT 428) can be received at BERT 1,422, on Node 2, or, if no data is added at Node 2, it can be received at BERT 1, 432, at Node 3. If data is dropped at Node 2, new data can be added at BERT 2 428 and transmitted to BERT 2,432, at Node 3. These BERTs are illustratively meant to represent users.

The third node would nominally be identical to Node 2, but here the third node has been simulated by the WDM device with a band pass filter to monitor its potential performance.

Figure 5:
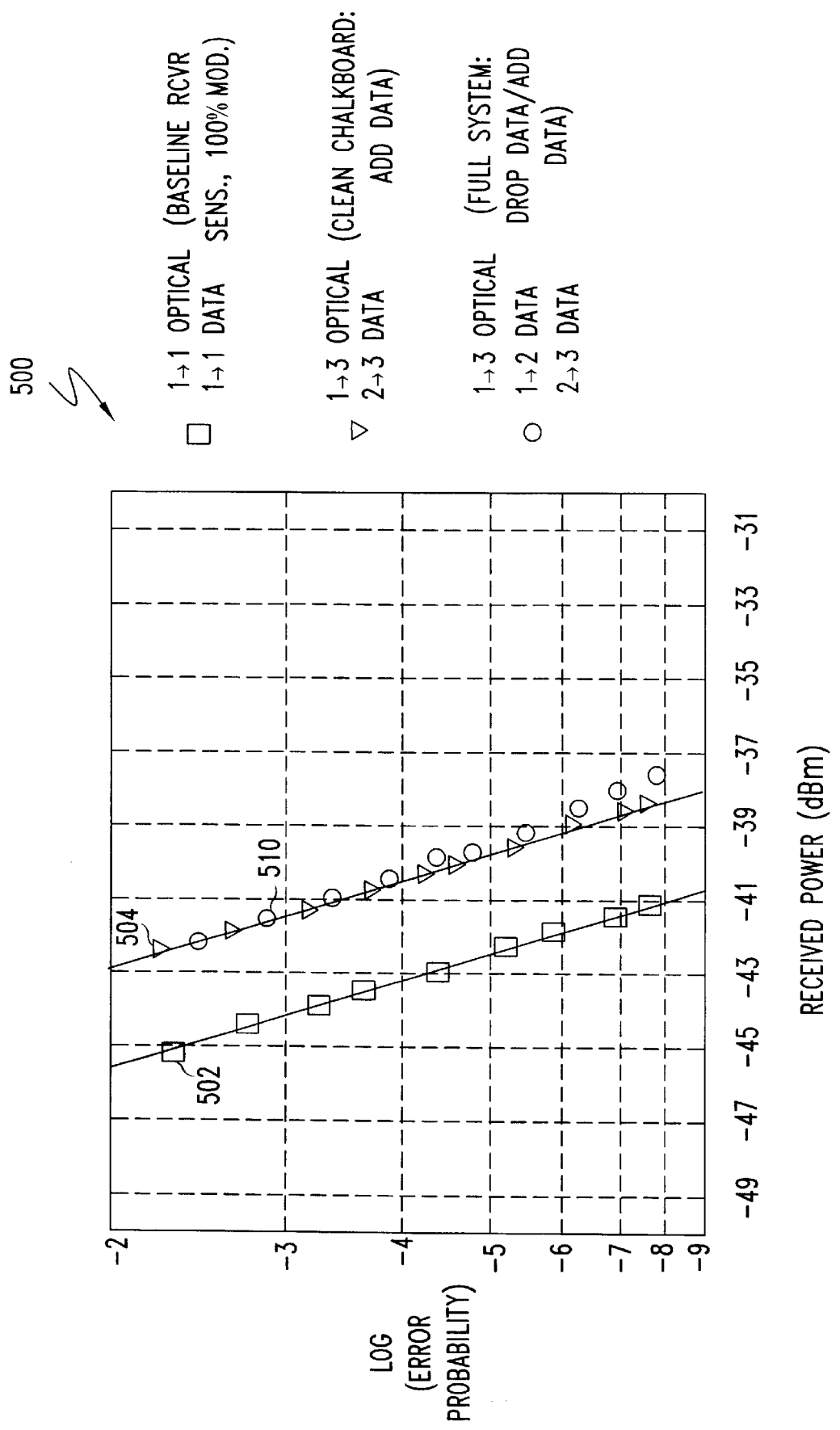
FIG. 5 is a graph showing the results measured from the experiment of FIG. 4.

FIG. 5 shows the system performance results of the test described in FIG. 4. In particular, FIG. 5 shows a plot 500 of a series of bit error rate (BER) curves which demonstrates the operation of the transceiver and the add/drop technique. In the plot 500, the squares 502 are back-to-back BERs for 100% modulation depth, showing the receiver sensitivity while the triangles 504 are BERs for 67% modulation and show an intrinsic (3 dB) penalty for this level of incomplete modulation. The linearity of the squares 502 and triangles 504 indicates predominately Gaussian noise of the wideband (700 MHz) receiver used.

The circles 510 represent the BER for the fully implemented technique: data at an OC-3 rate of 155 bps is dropped at the transceiver 410 BERT 412, the feed-forward signal is turned on to suppress the dropped data, and an independent OC-3 is created with the second modulator by the data in signal 429. The subscriber at node 3,430, detects the new OC-3 created by BERT 428. These points exhibit additional intersymbol interference (ISI) due to imperfect operation of the suppressions circuitry (center inset 420 of FIG. 4).

One impairment observed by the experiment is due to the interaction of the clocks of the incoming and outgoing signals. Undesired chalkboard spikes due to imperfect suppression at the modulator 418 were more likely to occur at times corresponding to bit transitions. These spikes corrupt the optical chalkboard, and are indistinguishable from imperfect signals created by modulator 422, and therefore can be treated as conventional "inter-symbol interference" (ISI). Since this ISI is more pronounced near bit transitions of the incoming data signals, one can observe a variation in the BER performance of the system as the temporal separation between the residual bit transitions (spikes on the chalkboard 304) and the bit transitions of the newly generated data signals 306 is varied (assuming the clocks of the dropped and added data are locked to one another). With locked clocks, this performance impairment to the added data transmission can be measured as a function of the relative phases of the two clocks. It is expected that the BER performance will suffer most as the residual transition spikes on the chalkboard are brought into alignment with the mid-point of the digital ones of the added data (the decision point of the added data when it arrives at its intended destination). Conversely, it is expected that the BER performance will suffer least when the spikes are one half of a bit period away from the decision point of the added data.

Figure 6:
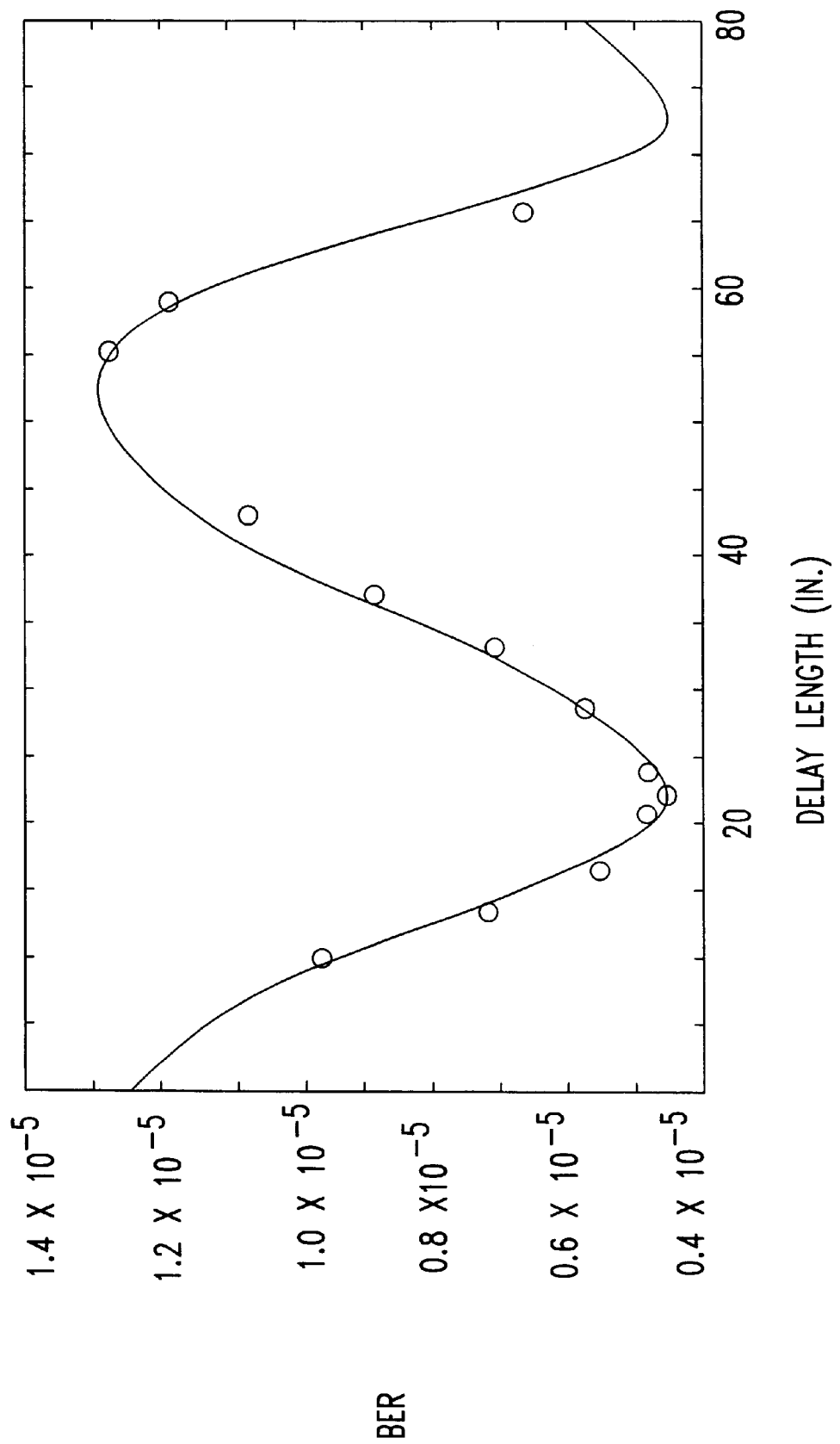
FIG. 6 is a graph showing the results measured from the experiment of FIG. 4.

The measured variation of BER for sliding the phase of the locked clocks is shown in FIG. 6. For this experiment, the "dropped data" clock, generated by BERT set 401, served as the master clock. The "added data" clock, generated by BERT set 428, is locked to the master clock. The relative clock phases could easily be varied in the laboratory by varying the length of the clock cable between these two BERTs. In practice, the clock recovered from the dropped data would be used to generate the added data with the optimum alignment for lowest BER. There is little implementation issue with such a constraint, because clock recovery is necessary for receiving downstream data. The major source of the suppression impairment is the mismatch between the dropped data and feed-forward modulation, predominately at the bit-transition edges. This effect can be seen in FIG. 6, in which the clocks of the two BER sets were locked, with varying links of cable imposing different relative phases between the spike errors on the chalkboard and the decision point at 428. As phase is changed between the two clocks, the transition errors on the optical chalkboard successively slide on the imposed data of BERT 428. This creates more errors when they are near the decision point than when they are near the transition edges.

FIG. 5 shows that there are possible impairments associated with this technique in certain applications. The most obvious is the imperfection due to the mismatch of the cancellation of the downstream signal. Without the use of an effective cancellation technique, this add/drop scheme will have limited cascadability. To avoid needing a modulator with frequency response much greater than the data rate, optical techniques, such as the use of a limiting optical amplifier may be able to reduce the impairments. Another source of possible impairments that may limit the cascadability of the system is the build up of ASE noise in the amplifiers. This is a problem in all cascaded networks, but may be more severe in the present case because of the partial modulation scheme.

Figure 7:
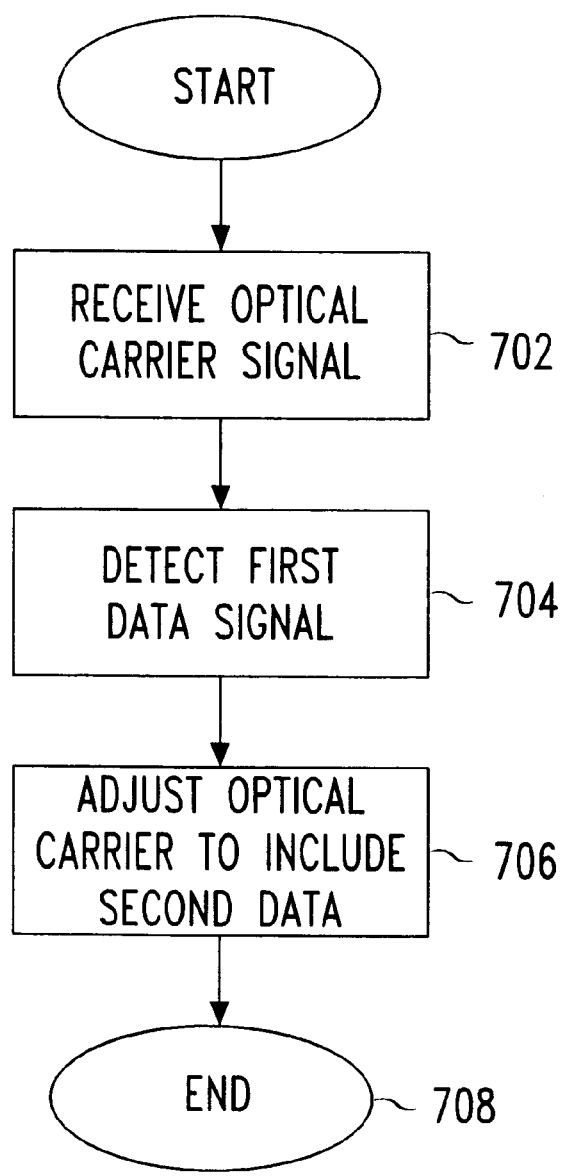
FIG. 7 is an exemplary flowchart of the process of dropping and adding data to an optical ring network according to the present invention.

FIG. 7 is a flowchart outlining an exemplary process of adding and dropping data to and from an optical data network according to the present invention. As shown in FIG. 7, in step 702 an optical carrier signal is received from a network and the process ends in step 708.

Next in step 704, the process detects first data present on the carrier signal. Once detected, the first data may be further processed, such as for communication purposes.

In step 706, the optical carrier is adjusted to include second data. Once adjusted, the optical carrier transfers the second data to a destination on the network.

Figure 8:
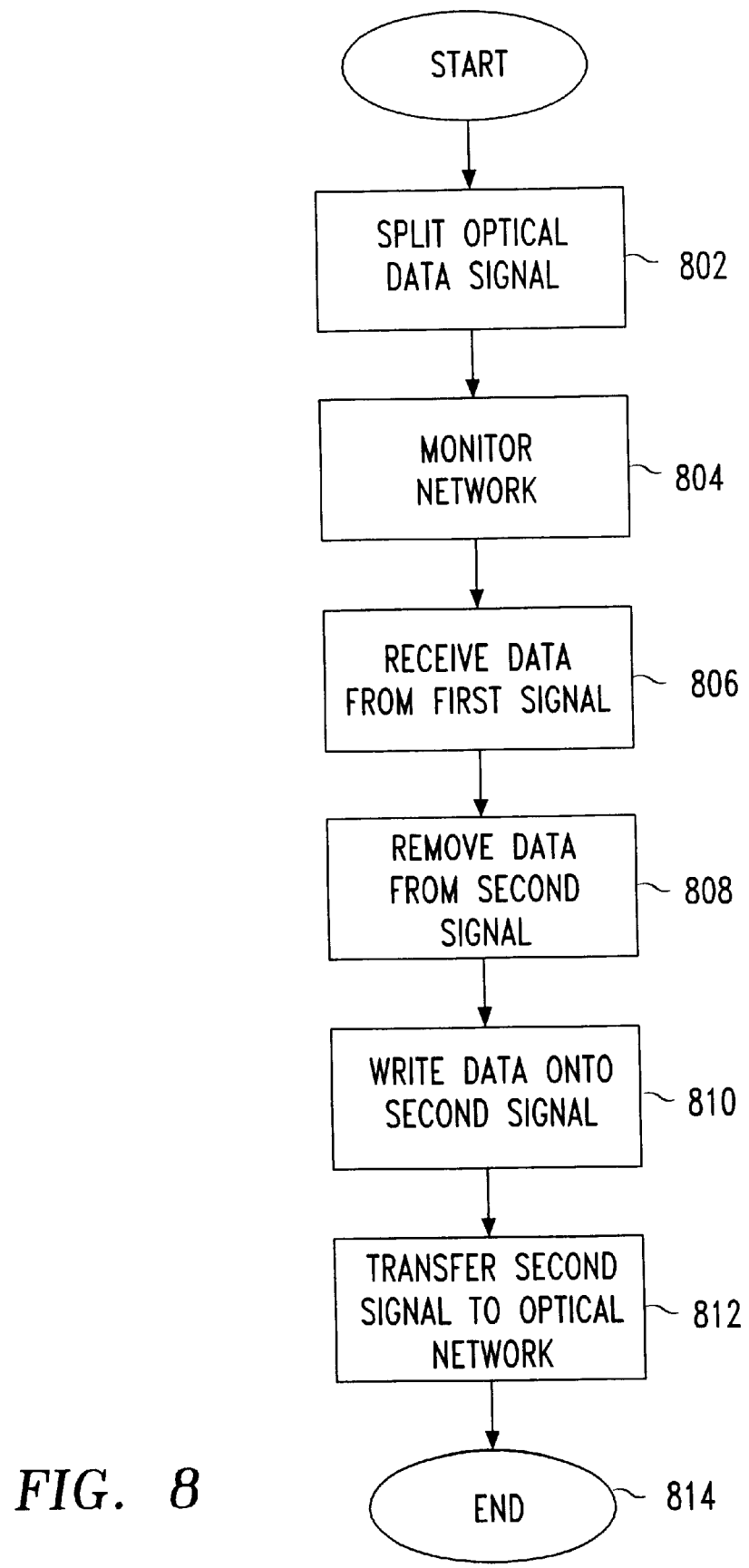
FIG. 8 is an exemplary flowchart of another process of dropping and adding data to an optical ring network according to the present invention.

FIG. 8 is a flowchart outlining another exemplary process of adding and dropping data to and from an optical data network according to the present invention. As shown in FIG. 8, in step 802 a channel of an optical network is split into a first and second optical data signal. In step 804, the first optical data signal is monitored for data signals.

Once an optical data signal is detected, the process then proceeds to step 806 where the first optical data signal is received by a subscriber. The first optical data signal may be converted into an electrical data signal. After receiving the signal, the process proceeds to step 808 where the process removes the data portion of the second optical data signal from the second optical signal based on the data of the first optical data signal. Once the data is removed from the second optical data signal the second optical data signal becomes a nominally flat signal having no data present thereon.

After the data has been removed from the second optical signal, in step 808, the process proceeds to step 810 and writes new data onto the second optical signal carrier, creating the second optical data signal. Subsequently, in step 812, the process places the second optical data signal containing the new data back onto the optical network. The process then proceeds to step 814, where the process ends.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for adding and dropping data from an optical network using a single optical carrier, comprising:
   accepting an optical signal from the optical network;
   splitting the optical signal into a first optical signal and a second optical signal;
   removing data from the second optical signal based on the first optical signal to create a third optical signal; and
   writing data onto the third optical signal.

2. The method according to claim 1, wherein removing data from the second optical signal to create the third optical signal, further comprises:
   converting the first optical signal into an electrical signal;
   inverting the electrical signal;
   converting the electrical signal into a suppressing optical signal; and
   combining the suppressing optical signal with the second optical signal to remove the data from the second optical signal.

3. The method according to claim 1, further comprising:

transmitting the third optical data signal on the optical network.

4. The method according to claim 1, wherein removing data from the second optical signal to create the third optical signal, further comprising:

inverting the first optical signal to form a suppressing optical signal; and combining the suppressing optical signal with the second optical signal to remove the data from the second optical signal.

5. The method according to claim 1, wherein the optical network is an optical ring network.

6. A method for adding and dropping data from an optical network using an optical carrier, comprising:

receiving an optical carrier containing first data;

detecting the first data on the optical carrier; and adjusting the optical carrier to include second data.

7. The method according to claim 6, wherein receiving the optical carrier further includes, splitting the optical carrier into a first portion and a second portion.

8. The method according to claim 7, wherein the first data is detected on the first portion of the optical carrier signal.

9. The method according to claim 8, wherein the second portion of the optical carrier signal is adjusted to remove the first data.

10. The method according to claim 6, further comprising:

removing the first data from the optical carrier using at least one of an optical limiter and an injection locked laser.

11. The method according to claim 9, wherein the second portion of the optical carrier is further adjusted to include second data.

12. An apparatus that adds and drops data from an optical network using a single optical carrier, comprising:

a receiver connected with the optical network that receives optical signals from the optical network;

an optical splitter connected with the receiver that splits the optical signal into a first optical signal and a second optical signal;

a suppressing modulator that removes data from the second optical signal based on the first optical signal to create a third optical signal; and a writing modulator that writes data onto the third optical signal.

13. The apparatus according to claim 12, wherein the suppressing modulator removes data from the second optical signal to create the third optical signal by converting the first optical signal into an electrical signal, inverting the electrical signal, converting the electrical signal into a suppressing optical signal, and combining the suppressing optical signal with the second optical signal to remove the data from the second optical signal and create the third optical signal.

14. The apparatus according to claim 12, wherein the suppressing modulator removes data from the second optical signal to create the third optical signal by inverting the first optical signal to form a suppressing optical signal and combining the suppressing optical signal with the second optical signal to remove the data from the second optical signal.

15. The apparatus according to claim 12, wherein the optical network is an optical ring network.

\* \* \* \* \*